United States Patent
Stasaski et al.

(10) Patent No.: US 11,049,126 B2
(45) Date of Patent: Jun. 29, 2021

(54) GAME BASED ON PAYMENT TRANSACTIONS IN ELECTRONIC PAYMENT TRANSACTION PROCESSING NETWORKS

(71) Applicant: Visa International Service Association, San Francisco, CA (US)

(72) Inventors: Dennis Michael Stasaski, Austin, TX (US); Moorthi Nataraj, Round Rock, TX (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 16/676,275

(22) Filed: Nov. 6, 2019

(65) Prior Publication Data

US 2021/0133791 A1    May 6, 2021

(51) Int. Cl.
*G06Q 30/02* (2012.01)
*G06Q 20/34* (2012.01)
(Continued)

(52) U.S. Cl.
CPC ......... *G06Q 30/0209* (2013.01); *G06Q 20/20* (2013.01); *G06Q 20/322* (2013.01); *G06Q 20/352* (2013.01); *G06Q 20/401* (2013.01); *G06Q 30/0236* (2013.01); *G06Q 50/01* (2013.01)

(58) Field of Classification Search
CPC ............. G06Q 30/0209; G06Q 20/401; G06Q 30/0236; G06Q 20/20; G06Q 20/352; G06Q 50/01; G06Q 20/322
See application file for complete search history.

(56) References Cited

U.S. PATENT DOCUMENTS

| 8,968,067 | B1* | 3/2015 | Curtis | A63F 13/798 463/6 |
| 2014/0358662 | A1* | 12/2014 | De Luca | G06Q 30/0226 705/14.27 |
| 2015/0120520 | A1* | 4/2015 | Prokopenko | G06Q 30/04 705/34 |

OTHER PUBLICATIONS

King et al. "Unfair play? Video games as exploitative monetized services: An Examination of game patents from a consumer protection perspective." Computers in Human Behavior, Elsevier, pp. 131-143. (Year: 2019).*

* cited by examiner

*Primary Examiner* — Michael W Schmucker
*Assistant Examiner* — Christopher C Busch
(74) *Attorney, Agent, or Firm* — Schwabe Williamson & Wyatt, PC (57) ABSTRACT

Embodiments include apparatuses, methods, and systems for playing a game based on payment transactions within an electronic payment transaction processing network. Based on data provided by a user, the user is authenticated to operate a game based on payment transactions. One or more payment cards used to perform payment transactions are to be registered within the game. A data record is added and an award within the game is received for a contactless payment transaction performed using the one or more payment cards. The data record is stored in a storage accessible by the game. The award is to be converted to a benefit to the user. The received award is displayed on a leaderboard in a user interface of the game. The leaderboard also displays one or more awards received by one or more other people associated with the user. Other embodiments may also be described and claimed.

13 Claims, 6 Drawing Sheets

(51) Int. Cl.
*G06Q 50/00* (2012.01)
*G06Q 20/40* (2012.01)
*G06Q 20/20* (2012.01)
*G06Q 20/32* (2012.01)

GAME BASED ON PAYMENT TRANSACTIONS IN ELECTRONIC PAYMENT TRANSACTION PROCESSING NETWORKS

BACKGROUND

An electronic payment transaction processing network may facilitate payment transactions among consumers, merchants, processors, banks, independent sales organizations (ISOs), or other payment processing parties. Every year, billions of electronic payment transactions and trillions of dollars are processed through the electronic payment transaction processing networks. Credit card or payment card are used to complete payment transactions within an electronic payment transaction processing network by various actions, e.g., contactless (tap), swipe, or insert cards. The credit card or payment card issuers may prefer one kind of action, e.g., contactless payment transactions, than others to complete the payment transactions. However, currently, contactless payment transactions are seeing mixed levels of adoption worldwide.

BRIEF SUMMARY

Embodiments disclosed herein include a computer-implemented method for playing a game based on payment transactions within an electronic payment transaction processing network. The method includes authenticating a user, based on data provided by the user, to operate a game. The game is to be operated on a processor of a computing device and based on payment transactions in an electronic payment transaction processing network. The method further includes registering within the game, through a user interface of the game displayed on the computing device, one or more payment cards. The one or more payment cards are used to perform payment transactions through the electronic payment transaction processing network. In addition, the method includes adding a data record for a contactless payment transaction performed using the one or more payment cards, and receiving an award within the game based on the contactless payment transaction performed. The data record is stored in a storage accessible by the game. The award is to be converted to a benefit to the user. Furthermore, the method includes displaying, on a leaderboard displayed in the user interface of the game, the received award. The leaderboard also displays one or more awards received by one or more other people associated with the user.

Embodiments disclosed herein include an executable software product stored on a non-transitory computer-readable medium containing program instructions that cause a processor of a computing device, in response to execution of the instructions by the processor, to perform various operations. In detail, the program instructions cause the processor to authenticate a user, based on data provided by the user, to operate a game. The game is to be operated on the processor and based on payment transactions in an electronic payment transaction processing network. The program instructions further cause the processor to register within the game, through a user interface of the game displayed on the computing device, one or more payment cards. The one or more payment cards are used to perform payment transactions through the electronic payment transaction processing network. In addition, the program instructions cause the processor to add a data record, to be stored in a storage accessible by the game, for a contactless payment transaction performed using the one or more payment cards. Furthermore, the program instructions cause the processor to receive, based on the contactless payment transaction performed, an award within the game. The award is to be converted to a benefit to the user. Moreover, the program instructions cause the processor to display, on a leaderboard displayed in the user interface of the game, the received award. The leaderboard also displays one or more awards received by one or more other people associated with the user.

Embodiments disclosed herein include computing device includes a display device and one or more processors coupled to the display device. The display device is to display a user interface of a game, while the one or more processors are configured to perform various operations. In detail, the one or more processors are configured to authenticate a user, based on data provided by the user, to operate the game. The game is to be operated based on payment transactions in an electronic payment transaction processing network. The one or more processors are configured to register within the game, through the user interface of the game displayed on the display device, one or more payment cards. The one or more payment cards are used to perform payment transactions through the electronic payment transaction processing network. In addition, the one or more processors are configured to add a data record, to be stored in a storage accessible by the game, for a contactless payment transaction performed using the one or more payment cards. Furthermore, the one or more processors are configured to receive, based on the contactless payment transaction performed, an award within the game. The award is to be converted to a benefit to the user. Moreover, the one or more processors are configured to display, on a leaderboard displayed in the user interface of the game, the received award. The leaderboard also displays one or more awards received by one or more other people associated with the user.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

The following description is presented to enable one of ordinary skill in the art to make and use the embodiments and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the current disclosure. Various embodiments will also be described in the context of particular methods having certain steps. However, the method and system operate effectively for other methods having different and/or additional steps and steps in different orders that are not inconsistent with the presented embodiments. Thus, the current disclosure is not intended to be limited to the embodiments shown, but is to be accorded the widest scope consistent with the principles and features described herein.

The disclosed embodiments relate to a game based on credit card or payment card payment transactions within an electronic payment transaction processing network. Credit card or payment card payment transactions can be completed by various actions, e.g., contactless (tap), swipe, or insert cards. Embodiments herein are related to specific improvements to the way computers operate, e.g., to play a game. However, embodiments herein are not related to a general game design. Instead, the game presented herein is related to payment transactions within an electronic payment transaction processing network. Embodiments herein may help to improve the merchant profit as a byproduct. Techniques provided herein may be applicable to contactless payment transactions performed using payment cards, and may also be applicable to any other ways to complete a payment transaction using a credit card or payment card. Still, embodiments herein are related to limited rules with specific characteristics, e.g., payment transactions within an electronic payment transaction processing network. The games presented here are not any generic games, but games integrated into the application, e.g., payment transactions, or more specifically, contactless payment transactions.

FIGS. 1(a)-1(d) illustrate an example game 110 to be operated on a computing device 102 based on payment transactions in an electronic payment transaction processing network 120, in accordance with various embodiments.

Figure 1A:
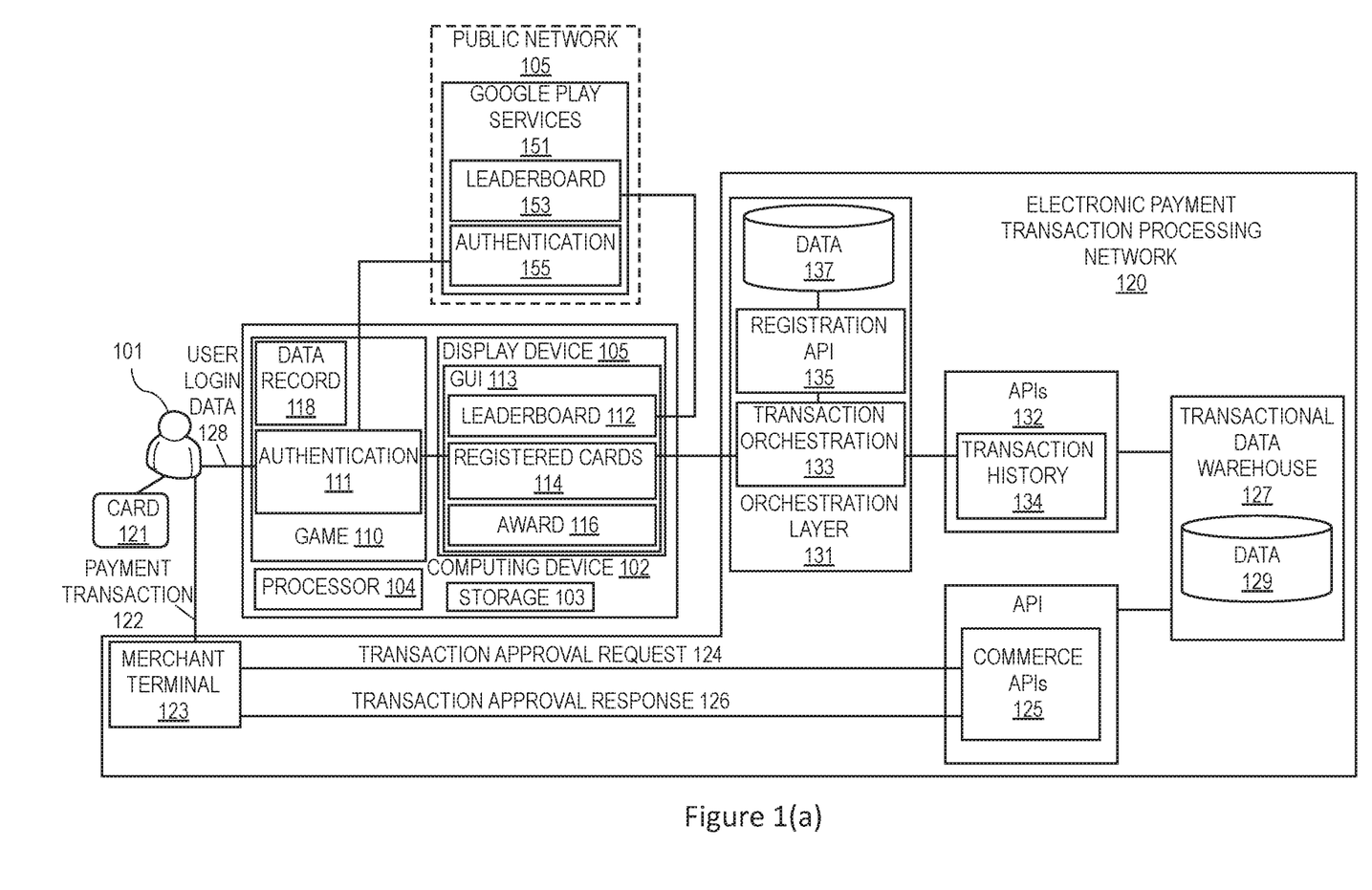
FIGS. 1(a)-1(d) illustrate an example game to be operated on a computing device based on payment transactions in an electronic payment transaction processing network, in accordance with various embodiments.

In embodiments, the computing device 102 includes a storage device 103, a processor 104, and a display device 105, coupled with each other. The display device 105 is to display a graphic user interface (GUI) 113 of the game 110. There may be many other components within the computing device 102, not shown. For example, there may be more than one processor within the computing device 102. The computing device 102 may be a smart phone, a laptop, a tablet, a personal computer, a point of sale (POS) terminal, a transaction terminal, or a handheld computer.

In embodiments, a user 101 may use a payment card 121 to perform a payment transaction 122 at a merchant terminal 123 through the electronic payment transaction processing network 120. For example, the merchant terminal 123 may send a transaction approval request 124 to a commerce API 125 for approval of the payment transaction 122. The commerce API 125 may determine to approve or reject the request for the payment transaction 122 based on data 129 stored in a transactional data warehouse 127 for the electronic payment transaction processing network 120. The commerce API 125 may further send a transaction approval response 126 to the merchant terminal 123 regarding the payment transaction 122. The payment transaction 122 may be a debit card transaction, a prepaid credit transaction, a credit transaction, a fund transfer transaction, a mobile payment transaction, an online transaction, or a commercial payment transaction. The payment transaction 122 may be performed by various actions, e.g., contactless (tap), swipe, or insert cards. When the payment transaction 122 is performed by a contactless action, it may be simply referred to as a contactless payment transaction. Compared to swipe or insert cards, contactless payment transactions may offer higher speed transactions for the merchant and the cardholder or user alike, saving time for the cardholder while increasing profit for the merchants. In embodiments, the game 110 is presented based on contactless payment transactions. However, in some other embodiments, the game 110 may be easily adapted to other forms of payment transactions, or to payment transactions of certain properties. For example, the game 110 may be customized to payment transactions performed in gas stations to encourage the usage of the payment cards in gas stations.

In embodiments, to play the game 110, the computing device 102 communicates with the electronic payment transaction processing network 120. The electronic payment transaction processing network 120 further includes modules or components that couple the computing device 102 to the transactional data warehouse 127 to play the game 110 on the computing device 102. For example, the electronic payment transaction processing network 120 further includes an orchestration layer 131 and APIs 132 to facilitate the connection between the computing device 102 and the transactional data warehouse 127. The orchestration layer 131 may include transaction orchestration module 133, registration API 135, and further include data 137 related to the game 110, which is separated from the transactional data warehouse 127. The APIs 132 may further include transaction history 134. The orchestration layer 131 and APIs 132 may not exist in a normal electronic payment transaction processing network.

Figure 1B:
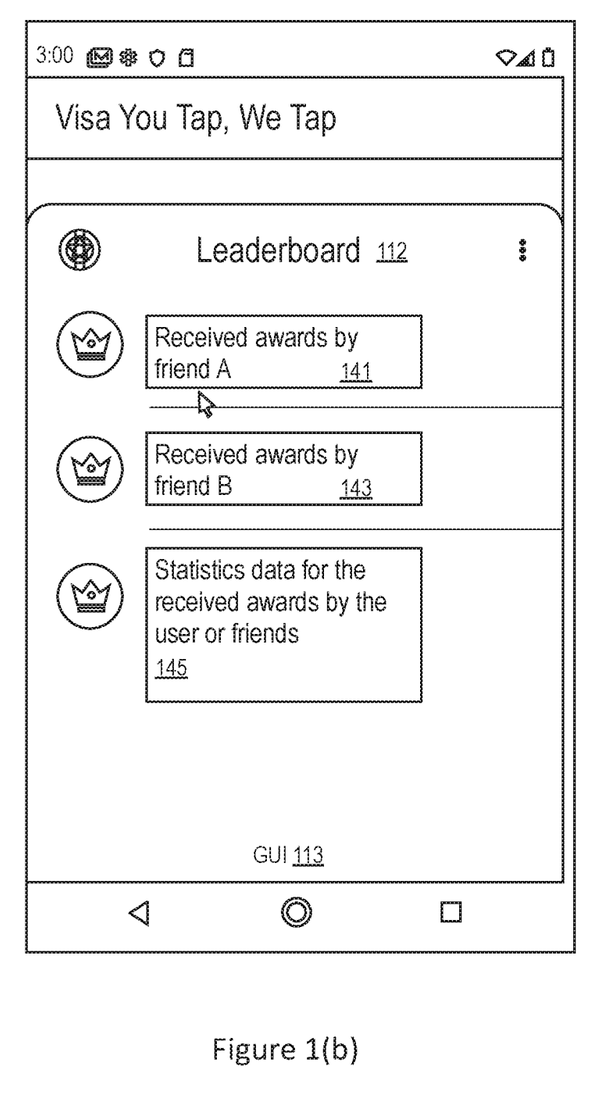
Figure 1C:
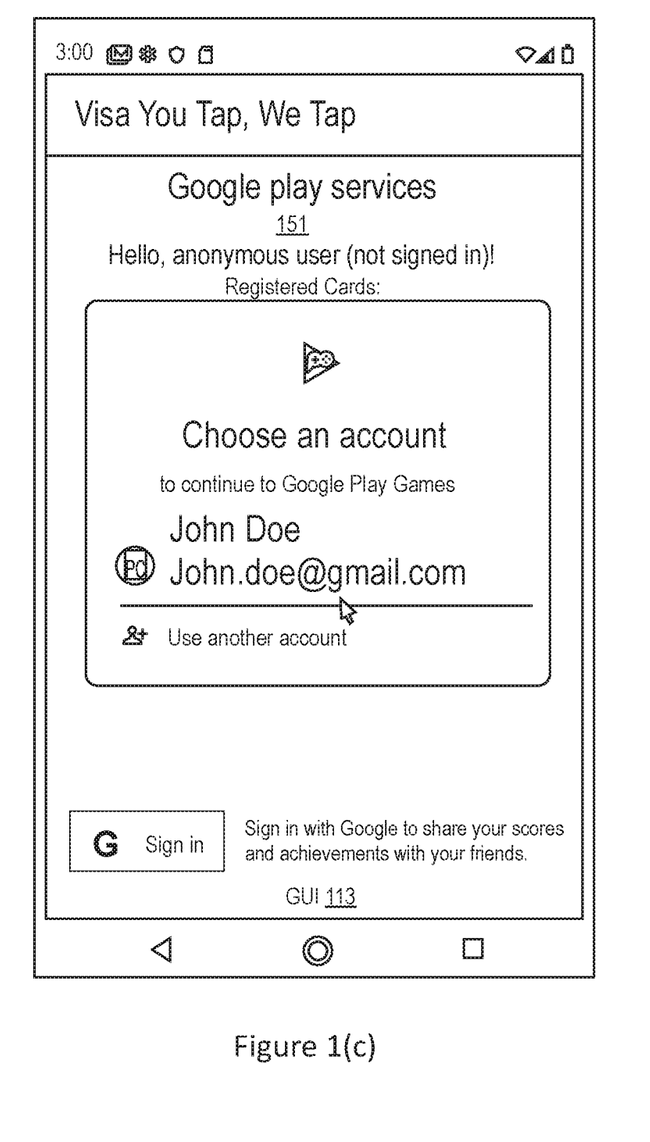

In embodiments, the game 110 may include an authentication module 111, the GUI 113 displayed on the display device 105, and a data record 118. The GUI 113 may display a leaderboard 112, a received award 116, and user registered cards 114. As shown in FIG. 1(b), the leaderboard 112 includes one or more awards received by one or more other people associated with the user 101, e.g., awards 141 received by friend A, awards 143 received by friend B. The one or more other people associated with the user 101 may be friends of the user 101 in a social media, e.g., Facebook®. In addition, the leaderboard 112 may include statistics data 145 based on a history of awards received by the user 101, or based on a history of awards received by the one or more other people associated with the user. The statistics data 145 based on the history of awards received by the user includes a count for a sequence of contactless payment transactions performed in a row, or an increased or decreased number of contactless payment transactions performed by the user in a first time period compared to a second time period. The game 110 may be an independent mobile application, a part of a social media application, or a part of another application. For example, the game 110 may be a part of a social media application, and the GUI 113 of the game 110 is a part of a social media website interface.

In embodiments, the processor 104 is configured to authenticate the user 101, based on login data 128 provided by the user 101, to operate the game 110, where the game 110 is to be operated based on payment transactions in the electronic payment transaction processing network 120. The authentication of the user 101 may be performed by the processor 104 of the computing device 102 locally. Alternatively, the authentication of the user 101 may be performed by an identity provider (IdP) based on the login data 128 provided by the user 101.

For example, as shown in FIG. 1(*a*), the authentication of the user 101 may be performed by Google play service 151 in a public network 105. The Google play service 151 may include an authentication module 155 that performs similar functions as the authentication module 111 locally on the computing device 102. If an IdP, e.g., Google play service 151, is used, the leaderboard 112 in the GUI 113 may be displayed as a leaderboard 153 in Google play service 151. FIG. 1(*c*) further shows some details of using Google play service 151 for authentication of the user 101 on the computing device 102. The user interface of login to Google play service 151 may be displayed on the GUI 113 for the game 110 so that the user 101 may choose a Google play service account for authentication. Google play service 151 is used as an example only, and is not limiting. Other IdP may be used to perform the authentication as well.

In embodiments, the processor 104 is further configured to register within the game 110, through the GUI 113 displayed on the display device 105, one or more payment cards, e.g., the payment card 121. The one or more payment cards, e.g., the payment card 121, are used to perform payment transactions through the electronic payment transaction processing network 120. The registration may be facilitated by the registration API 135 of the orchestration layer 131, which is used to connect the game 110 to the electronic payment transaction processing network 120. In registration the payment card 121, the registration API 135 may verify the payment card 121 information with the transactional data warehouse 127.

In embodiments, when a payment transaction is performed using the one or more payment cards, by a contactless action, the processor 104 is configured to add a data record, to be stored in a storage accessible by the game. For example, when the payment transaction 122 is performed by a contactless action using the payment card 121, and the payment card 121 is registered within the game 110 for the user 101, the processor 104 is configured to add a data record, e.g., the data record 118 corresponding to the payment transaction 122, to be stored in a storage accessible by the game 110. The data record 118 may be stored in the storage 103 of the computing device 102, or stored in the data 137 of the electronic payment transaction processing network 120. The data record 118 may include information of the contactless payment transaction 122 including an amount of money for the contactless payment transaction 122, a location for the contactless payment transaction 122, or an event associated with the contactless payment transaction 122.

In detail, the data record 118 for the contactless payment transaction 122 may be stored in the storage when the game 110 receives a notification that the contactless payment transaction 122 has been approved through the electronic payment transaction processing network 120 as indicated by the transaction approval response message 126. Once the game 110 receives the notification for the contactless payment transaction 122, the game 110 may obtain the information related to the payment transaction 122 from the transactional data warehouse 127, and store the data record 118 in a storage, e.g., the local storage 103 of the computing device, or the data 137 of the electronic payment transaction processing network 120. Furthermore, the data record 118 may be used to update the transaction history 134 stored in the APIs 132. The notification of the game 110 after the contactless payment transaction 122 has been approved through the electronic payment transaction processing network 120 would be an additional operation that does not exist for an electronic payment transaction processing network without interacting with the game 110. In embodiments, the data record 118 is saved for contactless payment transactions, and no data records of other forms of payment transactions are saved. In some other embodiments, a data record of a payment transaction of interests may be saved.

In addition, the processor 104 is configured to receive, based on the contactless payment transaction performed, an award within the game, and display, on the leaderboard 112 displayed in the GUI 113 of the game 110, the received award as the received award 116 shown in FIG. 1(*a*). As shown in FIG. 1(*b*), the leaderboard 112 also displays one or more awards received by one or more other people associated with the user, e.g. the awards 141 and the awards 143. The processor 104 may be configured to receive a notification when an award is displayed on the leaderboard for another user of the one or more other people associated with the user.

Figure 1D:
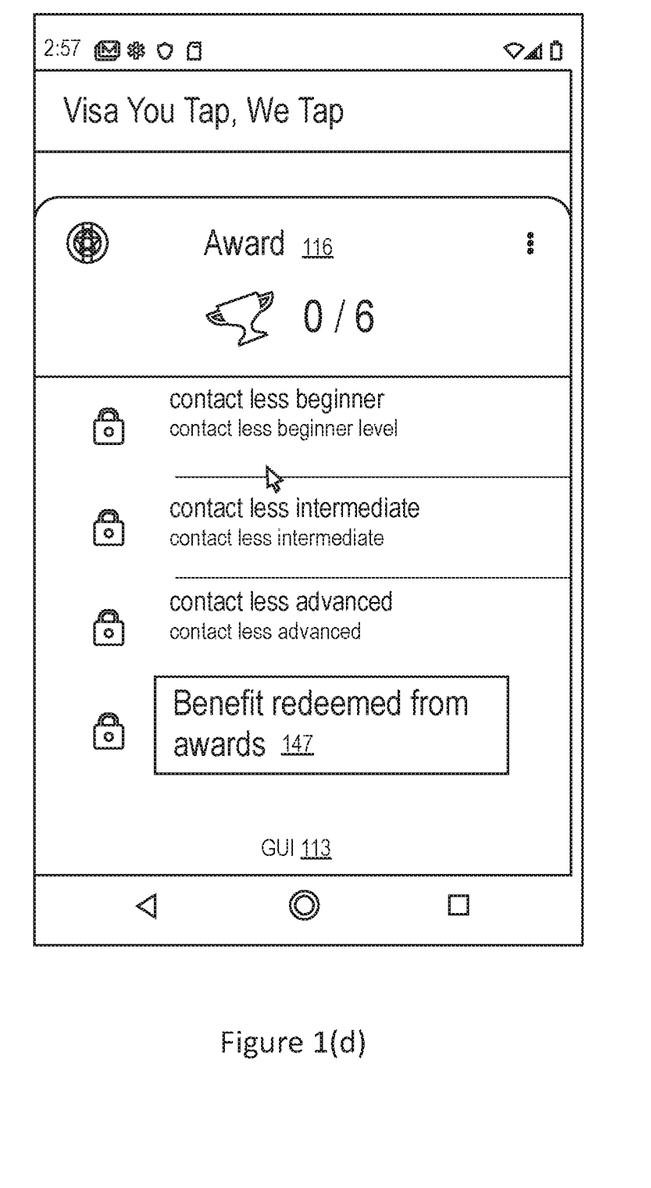

The leaderboard 112 may also display statistics data 145 based on a history of awards received by the user, or statistics data based on a history of awards received by the one or more other people associated with the user. The received award 116 may be provided based on the statistics data 145, an event when the contactless payment transaction is performed, or a location where the contactless payment transaction is performed. The received award 116 may be a unique award that is different from other awards received in other occasions when the contactless payment transaction is performed at a designated event. For example, a unique award may be received if the payment transaction is performed in a world cup event. Furthermore, as shown in FIG. 1(*d*), the award 116 may be divided into different classes or ranks, e.g., awards for contactless beginners who just start to use contactless payment transactions, contactless intermediate users who have used contactless payment transactions to certain amount of time, and contactless advanced users who have used contactless payment transactions for a large amount of time as compared to the contactless intermediate users. The classes and ranks shown in FIG. 1(*d*) are for examples only, and the user 101 or the game 110 may make customized changes to the classes and ranks shown for the received award 116.

In addition, the award is to be converted to a benefit to the user. For example, the processor 104 is configured to converting the award 116 into financial benefit for the user, shown as benefit redeemed from awards 147. The financial benefit may include a gift card, a prepaid card, a royalty program points, or an air travel points.

In embodiments, the transactional data warehouse 127 may refer to a set of components that work together to provide the overall data-warehousing capability to an organization. The transactional data warehouse 127 is different from a generic database. A database is the generic term for a storage system to store data, which is used for many purposes, including, for example, transaction processing, supporting application functionality and enabling reporting. Databases include, for example, online transactional processing (OLTP) used in application databases, online analytical processing (OLAP) used in data warehouses, XML, comma-separated values (CSV) files, text files and spreadsheets. Most databases are constrained in use to a specific application, business process or purpose. A database designed to handle transactions isn't structured to do analytics well. In comparison, a data warehouse is a specialized set of capabilities for extracting data from transactional systems and storing them in a specific type of database that it organized and optimized to support data analysis and reporting.

In embodiments, the transactional data warehouse 127 may include multiple databases that store data at different levels of transformation, including source databases, operational data stores, the core data warehouse database and specialized data marts that present filtered views of the data to users. The transactional data warehouse 127 may be implemented as a special relational database as a layer on top of other databases. In detail, the transactional data warehouse 127 may typically include one or more databases, tools for performing extract, transform and load (ETL) from source systems, capabilities for managing data schemas and the data dictionary, with tools for publishing data to data marts and consuming systems. The transactional data warehouse 127 is focused on collecting data from multiple sources to facilitate broad access and analysis, and further optimized to store large volumes of historical data and enables fast and complex querying of that data. The transactional data warehouse 127 specializes in data aggregation and provides a longer view of an organization's data over time. In addition, the transactional data warehouse 127 may serve as a query execution and processing engine for that data, enabling end users to interact with the data that is stored in the database over which the transactional data warehouse 127 is built on. Complex queries are very difficult to run without a temporary pause of database update operations. A frequently paused transactional database will inevitably lead to data errors and gaps. Therefore a data warehouse serves as a separate platform for aggregation across multiple sources and then for analytics tasks across those diverse sources. This separation of roles allows databases to remain focused on transactional jobs without interruption.

Figure 2:
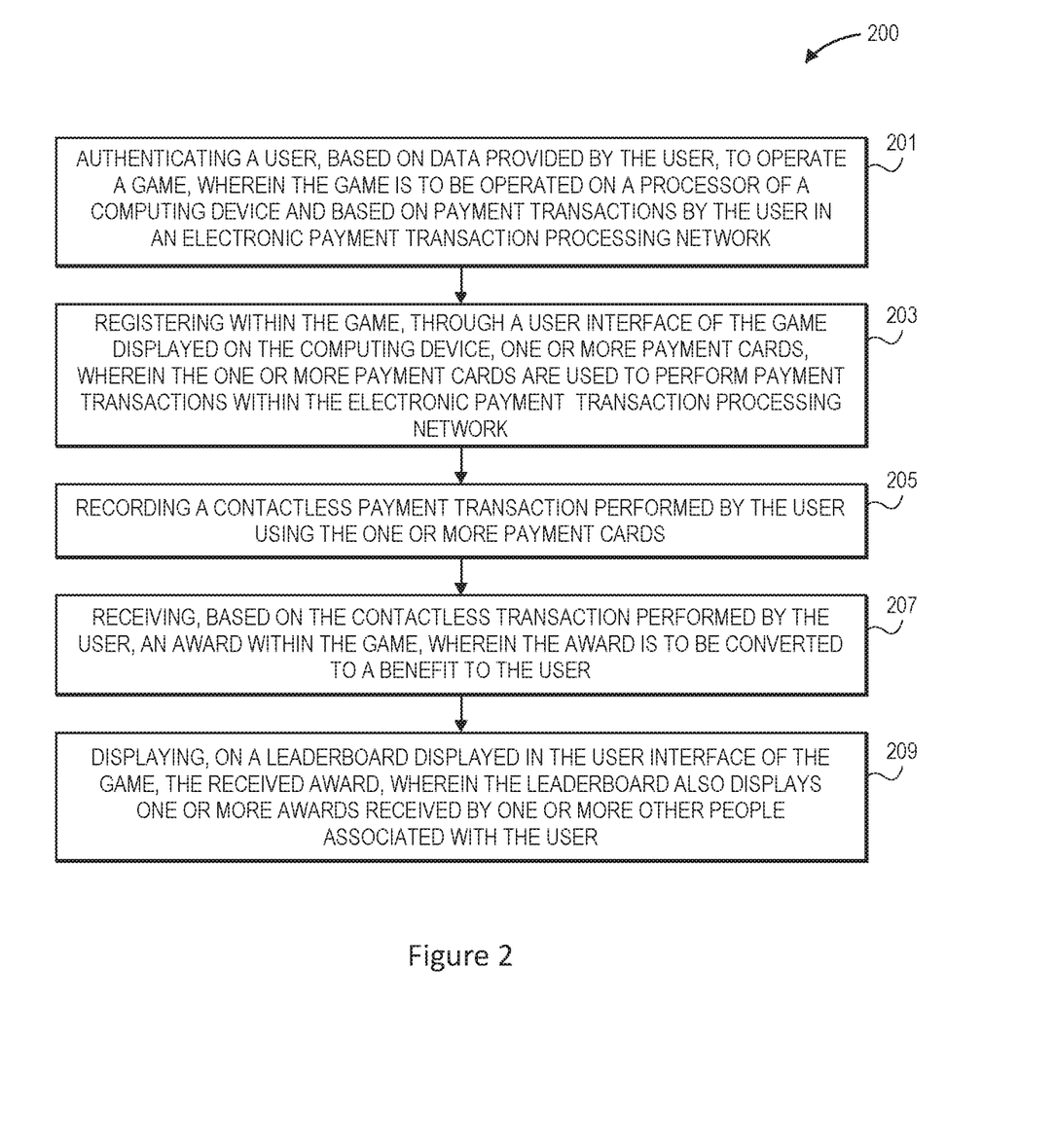
FIG. 2 illustrates an example process for playing a game on a computing device based on payment transactions in an electronic payment transaction processing network, in accordance with various embodiments.

FIG. 2 illustrates an example process 200 for playing a game on a computing device based on payment transactions in an electronic payment transaction processing network, in accordance with various embodiments. The process 200 may be applied to play the game 110 on the computing device 102 based on payment transactions, e.g., the payment transaction 122, in the electronic payment transaction processing network 120, as shown in FIG. 1(a).

In embodiments, at an interaction 201, the computing device 102 or the processor 104 within the computing device 102 is to authenticate a user, based on data provided by the user, to operate a game, where the game is to be operated on a processor of a computing device and based on payment transactions in an electronic payment transaction processing network. For example, the computing device 102 or the processor 104 is to authenticate the user 101, based on login data provided by the user 101, to operate the game 110, based on the payment transaction 122 in the electronic payment transaction processing network 120.

In embodiments, at an interaction 203, the computing device 102 or the processor 104 within the computing device 102 is to register within the game, through a user interface of the game displayed on the computing device, one or more payment cards, where the one or more payment cards are used to perform payment transactions through the electronic payment transaction processing network. For example, the computing device 102 or the processor 104 is to register within the game 110, through the GUI 113, the payment card 121, where the payment card 121 is used to perform payment transactions through the electronic payment transaction processing network 120.

In embodiments, at an interaction 205, the computing device 102 or the processor 104 within the computing device 102 is to add a data record, to be stored in a storage accessible by the game, for a contactless payment transaction performed using the one or more payment cards. For example, the computing device 102 or the processor 104 within the computing device 102 is to add the data record 118, to be stored in a storage accessible by the game 110, for a contactless payment transaction 122 performed using the payment card 121.

In embodiments, at an interaction 207, the computing device 102 or the processor 104 within the computing device 102 is to receive, based on the contactless payment transaction performed, an award within the game, where the award is to be converted to a benefit to the user. For example, the computing device 102 or the processor 104 is to receive, based on the contactless payment transaction 122, the award 116 within the game 110, where the award 116 is to be converted to a benefit to the user 101.

In embodiments, at an interaction 209, the computing device 102 or the processor 104 within the computing device 102 is to display, on a leaderboard displayed in the user interface of the game, the received award, where the leaderboard also displays one or more awards received by one or more other people associated with the user. For example, the computing device 102 or the processor 104 is to display, on the leaderboard 112 displayed in the GUI 113, the received award 116, where the leaderboard 112 also displays one or more awards received by one or more other people associated with the user.

Figure 3:
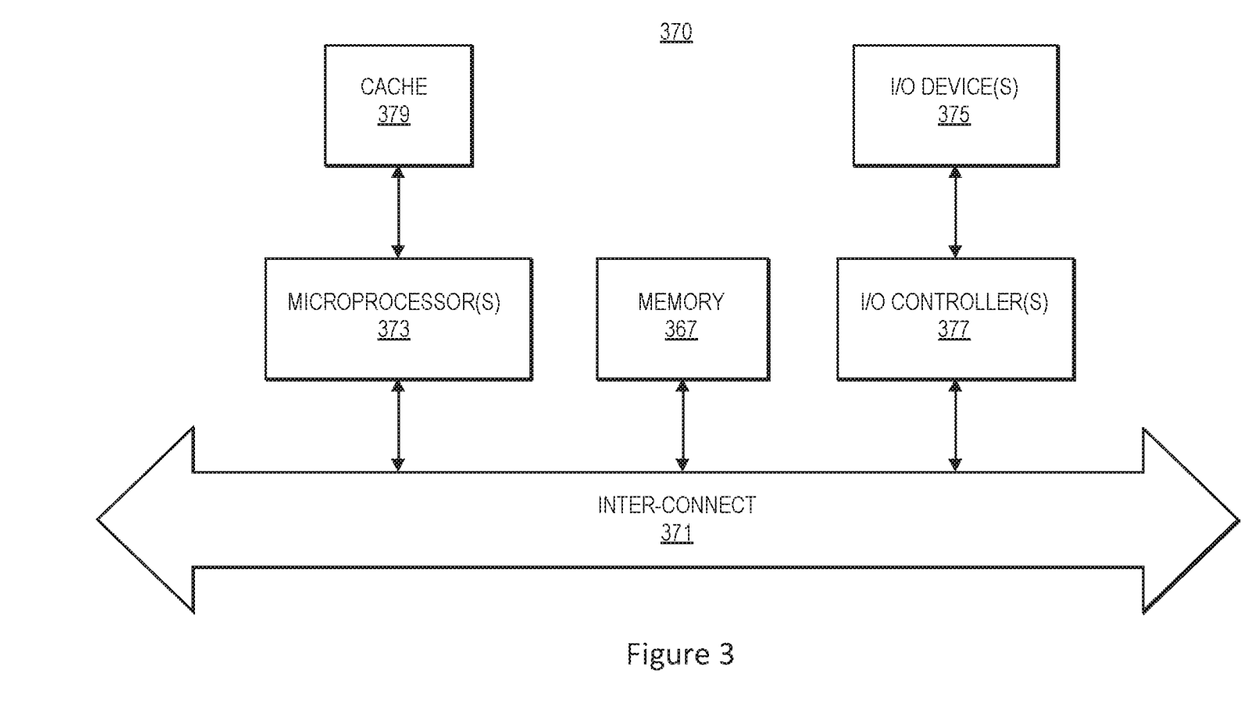
FIG. 3 illustrates an example device suitable for use to practice various aspects of the present disclosure, in accordance with various embodiments.

FIG. 3 illustrates an example device suitable for use to practice various aspects of the present disclosure, in accordance with various embodiments. While FIG. 3 illustrates various components of a computer system, it is not intended to represent any particular architecture or manner of interconnecting the components. One embodiment may use other systems that have fewer or more components than those shown in FIG. 3.

In FIG. 3, the data processing system 370 includes an inter-connect 371, e.g., bus and system core logic, which interconnects a microprocessor(s) 373, memory 367, and input/output (I/O) device(s) 375 via I/O controller(s) 377. The microprocessor 373 is coupled to cache memory 379. I/O devices 375 may include a display device and/or peripheral devices, such as mice, keyboards, modems, network interfaces, printers, scanners, video cameras and other devices known in the art. In one embodiment, when the data processing system is a server system, some of the I/O devices 375, such as printers, scanners, mice, and/or keyboards, are optional.

In one embodiment, the inter-connect 371 includes one or more buses connected to one another through various bridges, controllers and/or adapters. In one embodiment, the I/O controllers 377 include a USB (Universal Serial Bus) adapter for controlling USB peripherals, and/or an IEEE-1394 bus adapter for controlling IEEE-1394 peripherals.

In one embodiment, the memory 367 includes one or more of: ROM (Read Only Memory), volatile RAM (Random Access Memory), and non-volatile memory, such as hard drive, flash memory, etc. Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. That is, the techniques may be carried out in a computer system or other data processing system in response to its processor, such as a microprocessor, executing sequences of instructions contained in a memory, such as ROM, volatile RAM, non-volatile memory, cache or a remote storage device.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

In embodiments, a storage medium may store instructions for practicing methods described with references to FIGS. 1-3, in accordance with various embodiments. For example, a non-transitory computer-readable storage medium may include a number of programming instructions. Programming instructions may be configured to enable a device, e.g., the device 370, in response to execution of the programming instructions, to perform, e.g., various operations associated with an example game to be operated on a computing device based on payment transactions in an electronic payment transaction processing network, e.g., the game 110 to be operated on a computing device 102 based on payment transactions in an electronic payment transaction processing network 120, the process 200 for playing a game, or other operations described herein.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

The non-transitory computer-readable storage medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The description and drawings are illustrative and are not to be construed as limiting. The present disclosure is illustrative of disclosed features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

We claim:

1. A computer-implemented method, comprising:
providing, by an electronic payment transaction processing network, a game application for execution on a computing device of a user, wherein the game application displays a user interface on a display device to the user of the computing device;
implementing within the electronic payment transaction processing network i) a transactional data warehouse to store data related to electronic payment transactions, and ii) an orchestration layer and an orchestration API to facilitate the connection between the transactional data warehouse and a computing device of a user;
storing, by the orchestration layer, game data separately from the transactional data warehouse, wherein the orchestration layer comprises: i) a registration API to provide access to the game data and the transactional data warehouse, and ii) a transaction orchestration module;

receiving from the game application, by transaction orchestration module, a registration of a contactless payment card of the user through the user interface of the game application, the transaction orchestration module using the registration API to connect the game application to the transactional data warehouse for verification of the contactless payment card;

receiving from a merchant terminal, by the commerce API, a transaction approval request for a contactless payment card transaction using the contactless payment card of the user, and sending a transaction approval response to the merchant terminal regarding the contactless payment transaction based on processing by the transactional data warehouse;

transmitting to the game application, by the transaction orchestration module via the commerce API or the registration API, information related to the contactless payment transaction from the transactional data warehouse such that the game application creates and stores a data record in the a local storage of the computing device and in the game data of the orchestration layer, wherein the game application does not save data records of other forms of payment transactions; and responsive to the game application receiving the information related to the contactless payment transaction, displaying on the user interface at least a portion of the information related to the contactless payment transaction, including an award associated with the contactless payment transaction.

2. The method of claim 1, further comprising authenticating a user, based on data provided by the user, to operate a game, wherein the authenticating the user includes performing authentication by an identity provider (IdP) based on the data provided by the user.

3. The method of claim 1, wherein storing a data record in the a local storage of the computing device further comprises receiving a notification when the contactless payment transaction has been approved through the electronic payment transaction processing network; and storing information of the contactless payment transaction in the data record, including an amount of money for the contactless payment transaction, a location for the contactless payment transaction, or an event associated with the contactless payment transaction.

4. The method of claim 1, further comprising:
displaying, on the leaderboard within the game, statistics data based on a history of awards received by the user, or statistics data based on a history of awards received by the one or more other people associated with the user.

5. The method of claim 4, wherein the statistics data based on the history of awards received by the user includes a count for a sequence of contactless payment transactions performed in a row, or an increased or decreased number of contactless payment transactions performed by the user in a first time period compared to a second time period.

6. The method of claim 4, wherein the award is provided based on the statistics data, an event when the contactless payment transaction is performed, or a location where the contactless payment transaction is performed.

7. The method of claim 4, wherein the award is a unique award that is different from other awards received in other occasions when the contactless payment transaction is performed at a designated event.

8. The method of claim 1, wherein the financial benefit includes a gift card, a prepaid card, a royalty program points, or an air travel points; and the one or more payment cards include a debit card, a prepaid credit, or a credit card.

9. The method of claim 1, wherein the game application comprises an independent mobile application, a part of a social media application, or a part of another application.

10. The method of claim 1, wherein the computing device includes a smart phone, a laptop, a tablet, a personal computer, a point of sale (POS) terminal, a transaction terminal, or a handheld computer.

11. A system, comprising:
a game application executing on a computing device of a user, wherein the game application displays a user interface on a display device to the user of the computing device;

an electronic payment transaction processing network in communication with the game application, the electronic payment transaction processing network comprising:

a transactional data warehouse to store data related to electronic payment transactions;

an orchestration layer and an orchestration API to facilitate the connection between the computing device and the transactional data warehouse, the orchestration layer comprising:

game data stored separately from the transactional data warehouse;

a registration API to provide access to the game data and the transactional data warehouse; and a transaction orchestration module configured to receive, from the game application, a registration of a contactless payment card of the user through the user interface of the game application, the transaction orchestration module using the registration API to connect the game application to the transactional data warehouse for verification of the contactless payment card; and a commerce API configured to: i) receive, from a merchant terminal, a transaction approval request for a contactless payment card transaction using the contactless payment card of the user, and ii) send a transaction approval response to the merchant terminal regarding the contactless payment transaction based on processing by the transactional data warehouse;

wherein the transaction orchestration module is further configured to:

transmit to the game application, via the commerce API or the registration API, information related to the contactless payment transaction from the transactional data warehouse such that the game application creates and stores a data record in a local storage of the computing device and in the game data of the orchestration layer, wherein the game application does not save data records of other forms of payment transactions; and wherein responsive to the game application receiving the information related to the contactless payment transaction, the game application displays on the user interface at least a portion of the information related to the contactless payment transaction, including an award associated with the contactless payment transaction.

12. The computing device of claim 11, wherein the one or more other people associated with the user are friends of the user in a social media, and the user interface of the game is a part of a social media website interface; and the contactless payment transaction is a debit card transaction, a prepaid credit transaction, a credit transaction, a fund transfer transaction, a mobile payment transaction, an online transaction, or a commercial payment transaction.

13. The computing device of claim 11, the computing device includes a smart phone, a laptop, a tablet, a personal computer, a point of sale (POS) terminal, a transaction terminal, or a handheld computer.

\* \* \* \* \*